(12) United States Patent
Gundavelli et al.

(10) Patent No.: US 12,363,798 B2
(45) Date of Patent: **\*Jul. 15, 2025**

(54) TECHNIQUES FOR BINDING OPERATOR-DEFINED NETWORK SERVICE CONFIGURATIONS TO APPLICATIONS

(71) Applicant: Cisco Technology, Inc., San Jose, CA (US)

(72) Inventors: Srinath Gundavelli, San Jose, CA (US); Vimal Srivastava, Bangalore (IN); Ravi Kiran Guntupalli, Cumming, GA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/668,568

(22) Filed: May 20, 2024

(65) Prior Publication Data
US 2024/0306256 A1 Sep. 12, 2024

Related U.S. Application Data

(63) Continuation of application No. 17/464,158, filed on Sep. 1, 2021, now Pat. No. 12,082,307.

(51) Int. Cl.
*H04W 80/10* (2009.01)
*H04L 67/141* (2022.01)
(Continued)

(52) U.S. Cl.
CPC .......... *H04W 80/10* (2013.01); *H04L 67/141* (2013.01); *H04W 4/50* (2018.02); *H04W 40/02* (2013.01); *H04W 76/10* (2018.02)

(58) Field of Classification Search
CPC ....... H04W 80/10; H04W 4/50; H04W 40/02; H04W 76/10; H04L 67/141
See application file for complete search history.

(56) References Cited

U.S. PATENT DOCUMENTS 10,616,934 B2   4/2020  Talebi et al.
12,082,307 B2 *  9/2024  Gundavelli ........... H04L 67/141
(Continued)

FOREIGN PATENT DOCUMENTS

ES       2948309 T3    9/2023
WO    2017173259 A1   10/2017
(Continued)

OTHER PUBLICATIONS

3GPP: "3rd Generation Partnership Project; Technical Specification Group Core Network and Terminals; 5G System (5GS); Time-Sensitive Networking (TSN) Application Function (AF) to Device-Side TSN Translator (DS-TT) and Network-Side TSN Translator (NW-TT) protocol aspects; Stage 3 (Release 16)," 3GPP TS 24.519 V16.3.0, Dec. 2020, 73 Pages.

(Continued)

*Primary Examiner* — Joseph E Dean, Jr.
(74) *Attorney, Agent, or Firm* — Edell, Shapiro & Finnan, LLC

(57) ABSTRACT

Techniques are provided for operator specific customization of a network service configuration. In some embodiments, an operator defines a mapping between an application executing on a user equipment (UE) and a network service configuration. In some embodiments, the network service configuration indicates whether the application is to be supported via a UPF instance located within the core network or deployed at a network edge. The mapping is then provided to the UE, and passed back to the core network, for example, when the UE establishes a connection on behalf of the UE application. The core network then supports the UE application consistent with the configuration specified by the mapping.

20 Claims, 8 Drawing Sheets

(51) Int. Cl.
*H04W 4/50* (2018.01)
*H04W 40/02* (2009.01)
*H04W 76/10* (2018.01)

(56) References Cited

U.S. PATENT DOCUMENTS

| | | |
|---|---|---|
| 2019/0223055 A1 | 7/2019 | Bor Yaliniz et al. |
| 2020/0053622 A1 | 2/2020 | Huang-Fu et al. |
| 2020/0053828 A1 | 2/2020 | Bharatia et al. |
| 2020/0128503 A1 | 4/2020 | Li et al. |
| 2020/0154350 A1 | 5/2020 | Dao et al. |
| 2020/0187085 A1 | 6/2020 | Jagannatha et al. |
| 2020/0221361 A1 | 7/2020 | Bae et al. |
| 2020/0245381 A1 | 7/2020 | Talebi Fard et al. |
| 2020/0367297 A1 | 11/2020 | Dao et al. |
| 2021/0120596 A1 | 4/2021 | Youn et al. |
| 2021/0219357 A1 | 7/2021 | Talebi Fard et al. |
| 2021/0385633 A1 | 12/2021 | Wang et al. |
| 2022/0166776 A1 | 5/2022 | Lee et al. |
| 2022/0322202 A1 | 10/2022 | Li et al. |
| 2022/0345887 A1 | 10/2022 | Karampatsis et al. |

FOREIGN PATENT DOCUMENTS

| | | |
|---|---|---|
| WO | 2021045859 A1 | 3/2021 |
| WO | 2021069067 A1 | 4/2021 |

OTHER PUBLICATIONS

3GPP: "3rd Generation Partnership Project; Technical Specification Group Core Network and Terminals; 5G System (5GS); Time-Sensitive Networking (TSN) Application Function (AF) to Device-Side TSN Translator (DS-TT) and Network-Side TSN Translator (NW-TT) protocol aspects; Stage 3 (Release 17)," 3GPP TS 24.519 V17.1.0, Jun. 2021, 6 Pages.

3GPP: "3rd Generation Partnership Project; Technical Specification Group Core Network and Terminals; 5G System; Policy and Charging Control Signalling flows and QoS Parameter Mapping; Stage 3 (Release 17)," 3GPP TS 29.513 V17.4.0, Sep. 2021, 170 Pages.

3GPP: "3rd Generation Partnership Project; Technical Specification Group Services and System Aspects; Management And Orchestration; 5G Network Resource Model (NRM); Stage 2 And stage 3 (Release 17)," 3GPP TS 28.541 V17.2.1, Apr. 2021, 425 Pages.

3GPP, "3rd Generation Partnership Project; Technical Specification Group Services and System Aspects; Policy and charging control architecture (Release 17)", 3GPP TS 23.203 V17.1.0 Jun. 2021, 267 pages.

3GPP, "3rd Generation Partnership Project; Technical Specification Group Services and System Aspects; Policy and Charging Control Framework For The 5G System (5GS); Stage 2 (Release 17)," 3GPP TS 23.503 V17.1.0, Jun. 2021, 137 Pages.

3GPP, "3rd Generation Partnership Project; Technical Specification Group Services and System Aspects; Policy and charging control framework for the 5G System (5GS); Stage 2 (Release 17)," 3GPP TS 23.503 V17.2.0, Sep. 2021, 141 Pages.

3GPP: "3rd Generation Partnership Project, Technical Specification Group Services and System Aspects, Procedures for the 5G System (5GS), Stage 2 (Release 17)", 3GPP, Mobile Competence Centre, 650, Route Des Lucioles, F-06921 Sophia-Antipolis Cedex, France, vol. SA WG2, 3GPP TS 23.502, No. V17.1.0, Jun. 24, 2021, pp. 1-692, XP052029603, p. 105, Line 1-Line 5.

3GPP: "3rd Generation Partnership Project; Technical Specification Group Services and System Aspects; Procedures for the 5G System (5GS); Stage 2 (Release 17)," 3GPP TS 23.502 V17.2.1, Sep. 2021, 712 Pages.

3GPP: "3rd Generation Partnership Project; Technical Specification Group Services and System Aspects; System Architecture for the 5G System (5GS); Stage 2 (Release 17)," 3GPP TS 23.501 V17.1.1, Technical Specification, Jun. 2021, 526 Pages.

3GPP: "3rd Generation Partnership Project; Technical Specification Group Services and System Aspects; System Architecture for the 5G System (5GS); Stage2 (Release 17)," 3GPP TS 23.501 V17.2.0, Sep. 2021, pp. 1-542.

ITECTEC: "4.3.6 Application Function Influence on Traffic Routing," 10 Pages, [Retrieved on Aug. 26, 2021] Retrieved from URL: https://itectec.com/spec/4-3-6-application-function-influence-on-traffic-routing/.

Li Y., et al., "Research on Wireless Resource Management and Scheduling for 5G Network Slice," 2021 International Wireless Communications and Mobile Computing (IWCMC), IEEE, Jun. 28-Jul. 2, 2021, 6 Pages.

* cited by examiner

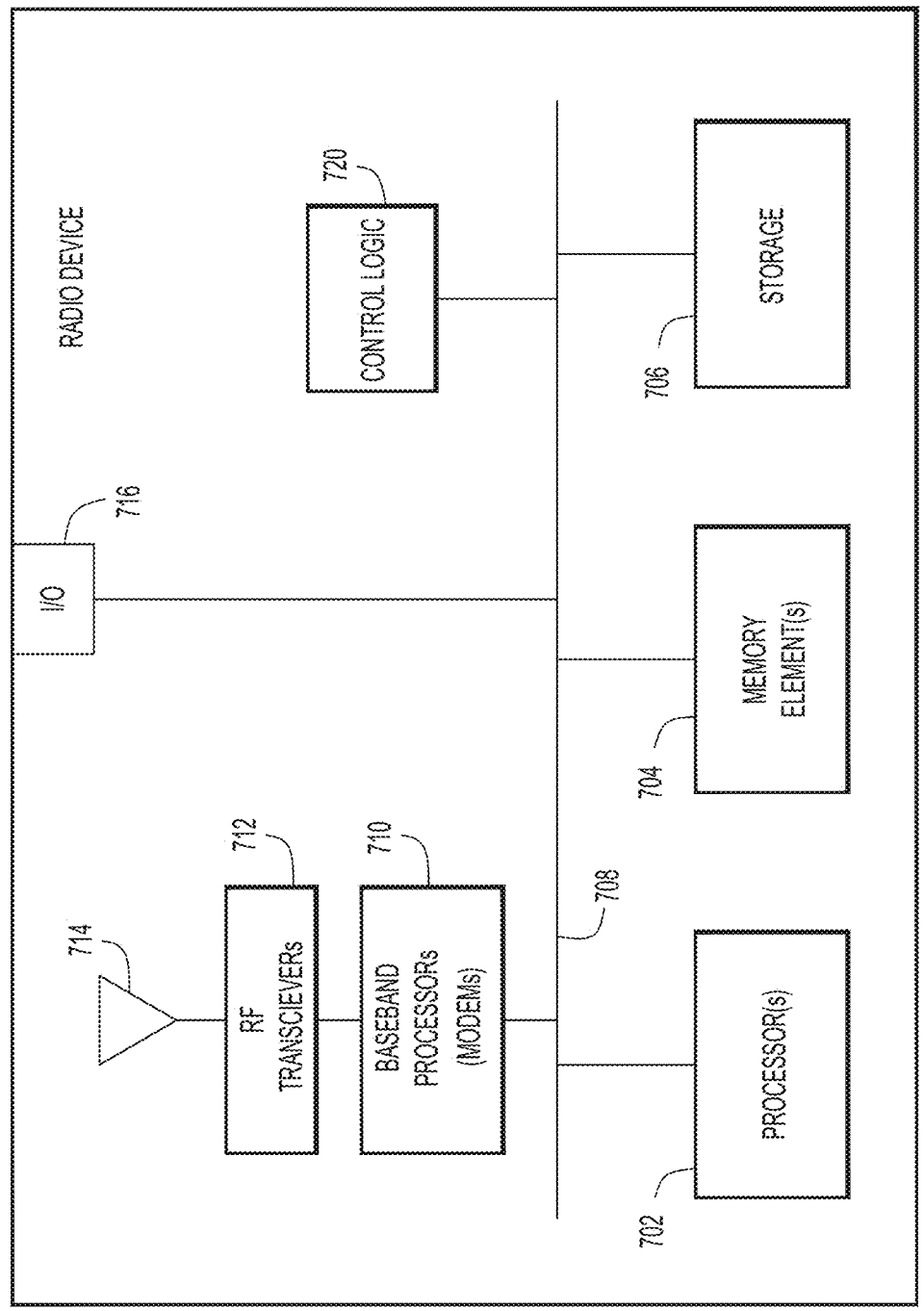

TECHNIQUES FOR BINDING OPERATOR-DEFINED NETWORK SERVICE CONFIGURATIONS TO APPLICATIONS

PRIORITY CLAIM

This application is a continuation of and claims the benefit of priority to U.S. patent application Ser. No. 17/464,158, filed Sep. 1, 2021, now U.S. Pat. No. 12,082,307, the entire contents of which are incorporated herein by reference.

TECHNICAL FIELD

The present disclosure relates to network equipment and services.

BACKGROUND

Mobile network operators are investing in multi-edge access computing (MEC) architectures. MEC sites are intended to serve as low-latency edge compute locations for latency sensitive applications. Content providers pay mobile operators to host their content/applications at these MEC sites.

In some MEC-aware mobility architectures, a control-plane is centralized, but a user-plane is distributed. The MEC sites host virtual radio access network (vRAN) elements and a user plane function (UPF), whereas the central site hosts the mobility control-plane functions and the user-plane functions. Typically, there are no control-plane elements in these MEC sites. The introduction of MEC sites presents new challenges for managing user equipment (UE) sessions for mobile network architectures.

BRIEF DESCRIPTION OF THE DRAWINGS

FIG. 7 is a hardware block diagram of a radio device that performs functions associated with operations discussed herein, in accordance with an example embodiment.

DESCRIPTION OF EXAMPLE EMBODIMENTS

Overview

Figure 1:
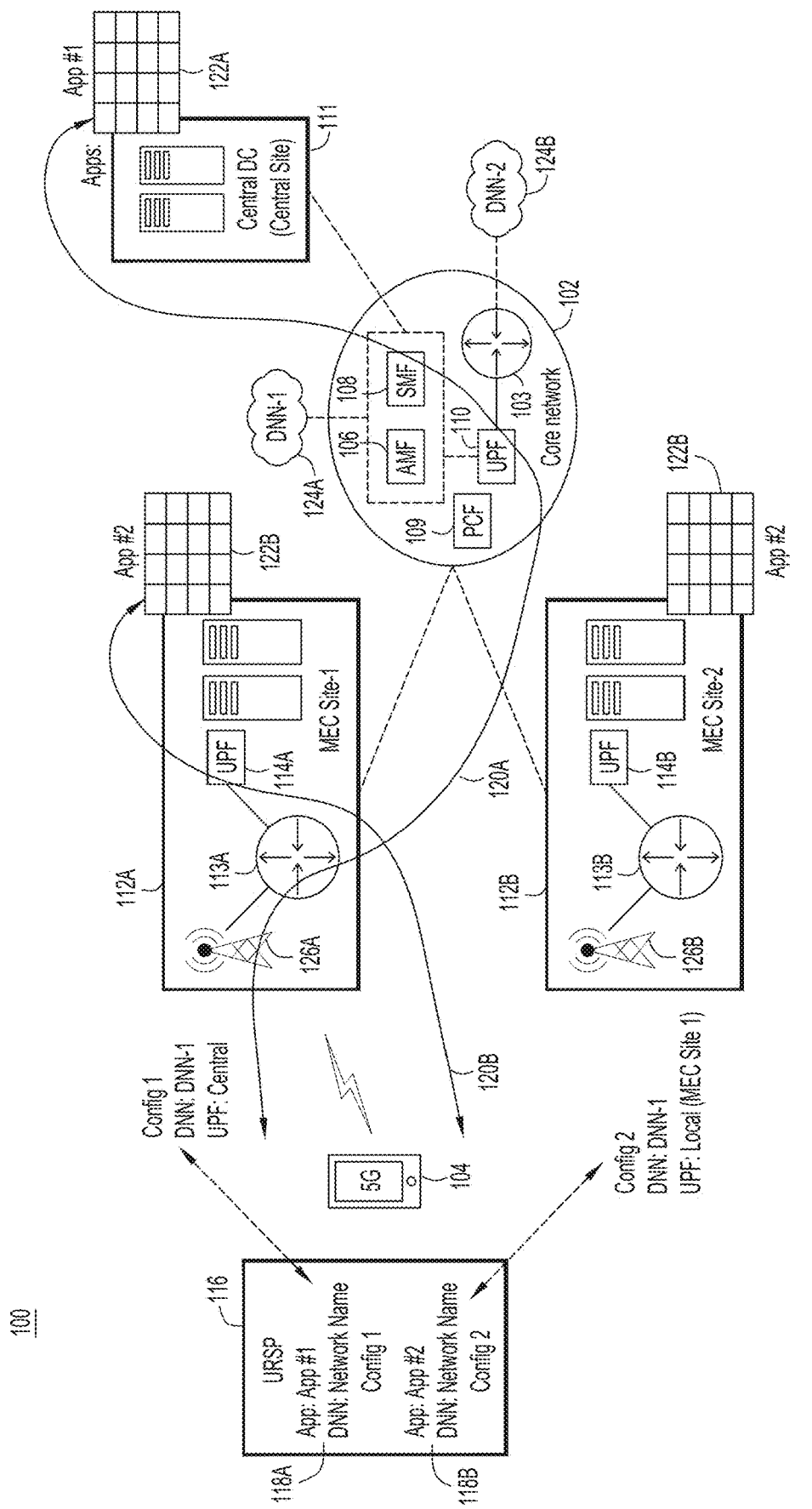
FIG. 1 is an overview diagram of a system in accordance with an example embodiment.

The disclosed embodiments allow an operator to specify network service configurations for particular applications hosted by the operator. This allows the network service configuration to be optimized for variations in how two operators implement an application. In one aspect, a method includes storing, by a core network, a mapping between a user equipment (UE) application and a core network service configuration, wherein the network service configuration is associated with a user plane function (UPF) type, providing, by the core network, the mapping to a UE, obtaining, from the UE, a connection request on behalf of the UE application, the connection request including the core network service configuration; and completing the connection request based on the core network service configuration obtained from the UE.

In one embodiment, a method is provided that may include storing, by a core network (e.g., via a Policy Control Function (PCF)), a mapping between a user equipment (UE) application and a network service configuration, wherein the network service configuration is associated with a user plane function (UPF) type; providing, by the core network, the mapping to a UE; obtaining, from the UE, a connection request on behalf of the UE application, the connection request including the network service configuration; and completing the connection request based on the network service configuration obtained from the UE. In one instance, completing the connection request may include determining the UPF type based on the network service configuration; selecting a UPF instance according to the UPF type; and completing the connection request based on the selected UPF instance. In one instance, determining the UPF type includes determining whether the network service configuration indicates a UPF instance deployed in a central data center or a UPF instance deployed at a network edge, and wherein the selecting of the UPF instance is in accordance with the indication. In one instance, determining the UPF type includes determining a UPF instance configured to process encrypted traffic is indicated by the network service configuration, and wherein the selecting includes selecting the UPF instance configured to process encrypted traffic based on the determination.

Example Embodiments

Use of a distributed user plane as described above provides the operator with flexibility to anchor UE sessions closer to an application function. With such an architecture, it is advantageous for applications that are hosted at the MEC site to anchor a session at a UPF instance located at the MEC site. For internet-bound traffic or for applications hosted at a central site, a session is anchored at a UPF instance located at a central-site.

To implement this approach, one solution is to configure two data network names (DNN's), a MEC-specific DNN and a global DNN. However, many operators disfavor this approach. Instead, the operators prefer to rely on a single DNN, while routing traffic based on the application to either the MEC site or central site. Thus, the UE creates two Protocol Data Unit (PDU) sessions in a given DNN, one PDU session anchored in a central UPF instance, and the other PDU session anchored in a UPF instance located at the MEC site. Thus, the general concept is to provide service differentiation within a DNN.

However, the requirement to implement such a solution exposes gaps in the 3GPP system architecture. First, not all PDU sessions created in a given DNN provide an equivalent service. For example, with two PDU's created in a common DNN, one may be hosted in an edge UPF instance and another hosted on a UPF instance deployed in a more central location. These two UPF instances provide different service treatment. For example, a path taken by traffic of each of these two PDU's is different. There are additional examples where two PDU's created in the same DNN have different service behavior. Second, a URSP binds applications to several parameters, such as a Single-Network Slice Selection Assistance Information (S-NSSAI), a DNN, or a Radio Access Technology (RAT). However, there are no other operator specific indicators, for requesting more specific services. Third, there are no semantics in a request for PDU creation to pass additional indicators. Instead, parameters from a UE passed to an AMF/SMF during PDU session creation include, in some embodiments, an S-NSSAI, a DNN, a RAT Type and a secondary component carrier (SSC) mode. Generally, these parameters are not sufficient for the network to provide specific additional service for that PDU session, beyond what is offered for the PDU at the DNN level.

While it might be possible to create more specific services using different DNNs, each DNN comes with a relatively large configuration overhead. IP address pools, virtual routing and forwarding (VRF), security policies, and other configuration elements are necessary to configure a DNN. Thus, creating separate DNNs for each service behavior would be complex, expensive, and difficult to manage. What is needed is a flexible method for associating an operator with a tag, and then provide service differentiation based on the tag.

Thus, the disclosed embodiments introduce a new operator defined data field, also referred to herein as an 'Operator-Service-Tag', that indicates a network service configuration. The network service configuration is utilized to select, for a specified application, one or more network functions (NFs) to handle a PDU session initiated on behalf of the specified application. The Operator-Service-Tag provides for multi-PDU connectivity to a single DNN. An additional purpose of the operator defined data field is to indicate an operator specific hint for requesting more specific service in a given DNN for a given application. In some embodiments, the operator defined data field indicates a deployment configuration of a UPF instance. For example, the operator defined data field indicates, in some embodiments, whether a particular application is to use a core deployed UPF instance or an edge deployed UPF instance. Thus, the operator defined data indicates, in some embodiments, one of three network service configurations. A first network service configuration indicates an edge UPF instance is requested for use with a particular connection or UE application, a second network service configuration indicates a central UPF instance is requested, and a third network service configuration indicates a UPF capable of supporting encryption (e.g., a 'crypto' capable UPF) is requested. In some embodiments, the Operator-Service-Tag is multi-dimensional, and is thus able to communicate two or more different independent states or indications. Thus, for example, in some embodiments, a first dimension indicates whether a UPF instance is deployed at a network edge (e.g., at a MEC site), or the UPF instance is deployed at a central location. A second dimension of the operator service tag then indicates whether the UPF instance is configured to process encrypted traffic (e.g., network communications) or traffic in the clear.

In some embodiments, the operator defined data field is provided, by the core network, to a user equipment (UE) associated with the operator that defined the field. Thus, a first operator's UEs receive a first value of the operator defined data field, while a second operator's UEs receive a second value of the operator defined data field.

The UE then passes the operator defined data field to the core network under various circumstances, for example, when establishing a connection (e.g., via a connection request) on behalf of a particular application. In some embodiments, the operator defined data field is included in a user equipment (UE) route selection policy (URSP) that is provided to the UE by the core network (e.g., via a registration response message from the core network to the UE). The UE then obtains a mapping of the particular network application to a network service configuration from the URSP, and provides the network service configuration to the core network as part of the connection request. For example, when the UE requests the network for PDU session creation, it will include the network service configuration (e.g., Operator-Service-Tag) in the request.

The core network (e.g., an Access and Mobility Management Function (AMF) instance and/or a Session Management Function (SMF) instance) then utilizes the network service configuration specified by the UE, in addition to slice identifying information (such as a S-NSSAI, DNN, RAT type information, etc.) when establishing and/or otherwise servicing the connection. The value of the network service configuration is used, in some embodiments, to select a UPF instance to handle the PDU session and, in some instances, can be used in the selection of an SMF instance for the PDU session. For example, the SMF establishes a PDU session via a UPF instance meeting the network service configuration indicated by the operator defined data, in at least some embodiments. The network service configuration may also be used by the operator for other service differentiation.

In essence, techniques herein provide for delivering a policy to a UE (e.g., a URSP) by a 3GPP Fifth Generation (5G) and/or next Generation (nG) core network for binding applications to a specific service tag (e.g., an Operator-Service-Tag) such that the service tag can be used by the UE to indicate a network service configuration when establishing a PDU session for a particular application for the UE.

In some embodiments, a URSP may be structured as described below:

{APP-1, S-NSSA1-1, DNN-1, RAT Type NR, Operator-Service-Tag} where:

APP-1 identifies an application name or type,

S-NSSA1-1 identifies single-network slice selection assistance information,

DNN-1 identifies a data network name,

RAT-Type NR identifies a radio access technology (RAT) type, and

Operator-Service-Tag represents the new operator-defined data field, indicating the type or property of a UPF instance requested for a session.

Some embodiments predefine constants and associate those constant values with particular network service configurations. An operator service tag then indicates a particular constant value to indirectly indicate a particular network service configuration. For example, in some embodiments, constants are defined to indicates a UPF type or property, as follows:

PROPERTY_EDGE_UPF (e.g., for UPF at an edge or MEC site),

PROPERTY_CENTRAL_UPF (e.g., for a UPF at a central data center), and

PROPERTY_CRYPTO_CAPABLE_UPF (e.g., for an encryption capable UPF)

Each of "PROPERTY_EDGE_UPF," "PROPERTY_CENTRAL_UPF," and "PROPERTY_CRYPTO_CAPABLE_UPF" are text labels of different predefined constant values indicating different network service configurations, as indicated.

In existing networks, a UPF configuration of a PDU session is, in some circumstances, reconfigured. For example, an application function (AF) triggered UPF reconfiguration can impact a UE with an active PDU session. Thus, some networks provide a control hook that enables an AF to move a set of UE's to a different UPF. In contrast, at least some of the disclosed embodiments influence initial UPF selection prior to a PDU session establishment. This initial UPF selection is based on the operator defined data as described above. Thus, these embodiments provide a more pro-active approach by initially selecting a UPF configuration based on an application that is to be serviced, an operator's MEC-service awareness, and/or other considerations. These embodiments provide more specific services for PDUs bound to a common DNN. Thus, these embodiments compare favorably to AF UPF reconfiguration, which changes a configuration of an existing PDU session.

While adapting a UPF configuration is possible using reconfiguration (e.g. anchor a PDU session at a centrally located UPF and later perform UPF re-selection, such a solution has disadvantages. For example, if a UE requests creation of a PDU session on behalf of an application best serviced via a UPF located at a MEC site, but an initial PDU session is established via a centrally located UPF, a UPF re-selection trigger cannot be sent unless the core network has visibility to the application that the UE is attempting to use for that PDU session. In circumstances where a particular UE is executing at least two application, a first application that is best serviced via a UPF located at a MEC site, and a second application best serviced via a centrally located UPF, the UE creates only a single PDU session if both applications are bound to a common route selection policy (e.g., via NSSAI+DNN). In this case, both the first application and second application will utilize a common PDU session, despite the two applications having different characterizations best serviced by different UPF configurations. Existing URSPs do not include any indication for the UE to determine that the two applications (created under a common S-NSSAI and a common DNN) are best served via different PDU sessions and/or UPF configurations. Moreover, there is no additional meta-data available associated with any PDU session elements from which a UE can make such a distinction between the two applications.

The disclosed embodiments solve the problem described above via the operator defined data that, in some embodiments, indicates a mapping between an application name or type and a UPF configuration as described above. Thus, the disclosed embodiments allow the core network to understand UE application requirements and allow the core network to perform a UPF selection based on the particular UE application for which a PDU session is being established. Some of these embodiments provide semantics in a URSP for service differentiation with a DNN. With these embodiments, a need for re-anchoring is substantially reduced, if not eliminated. Furthermore, there is a reduced or eliminated need to update URSP policies dynamically. The disclosed operator defined data can also map other types of network service configurations to applications when needed, and is not limited to indicating only UPF configurations.

FIG. 1 is an overview diagram of a system 100 in accordance with an example embodiment. The system 100 of FIG. 1 illustrates a core network 102 and a UE 104. The core network 102 includes an AMF instance 106, an SMF instance 108, a Policy Control Function (PCF) instance 109, and a centrally located UPF instance 110 provided at a central site, which may be implemented via a central data center (DC) 111. Also shown in FIG. 1 are two MEC sites, MEC site 112A and MEC site 112B. Two data networks are also illustrated in FIG. 1, including a data network, DNN-1 124A, and a data network DNN-2 124B. The MEC site 112A includes an edge UPF instance 114A, and the MEC site 112B includes an edge UPF instance 114B. The MEC site 112A also includes a gNodeB 126A, which interfaces with edge UPF instance 114A via one or more routing/switching elements 113A. The MEC site 112B also includes a gNodeB 126B, which interfaces with edge UPF instance 114B via one or more routing/switching elements 113B. Each MEC site 112A and 112B further interfaces with DC 111/core network 102. Each of the elements of core network 102 (e.g., AMF instance 106, SMF instance 108, PCF instance 109, and UPF) may interface among one another in order to facilitate operations as discussed herein.

The DNN-1 124A hosts two application servers, a first application server 122A, and a second application server 122B. An operator has determined that the first application server 122A is best communicated with via the centrally located UPF instance 110, located within the central DC 111 in which UPF instance 110 may further interface via one or more routing/switching elements 103 with DNN-2 124B. The second application server 122B is best serviced by a UPF instance located within a MEC site (e.g. either the edge UPF instance 114A of MEC site 112A, or the edge UPF instance 114B of MEC site 112B).

A URSP is used can be a UE, such as the UE 104 to determine how to route outgoing traffic according to capabilities of an application initiating the outgoing traffic. Generally, one or more URSPs for one or more UEs can be stored at PCF instance 109 and provided to UEs upon registration with the core network 102. FIG. 1 illustrates a URSP 116 that was provided to the UE 104 by the core network 102 (e.g., PCF instance 109). The URSP 116 includes two mappings. A first mapping 118A maps a first application (e.g. "App 1") to a first network service configuration (e.g., "config 1"). A second mapping 118B maps a second application (e.g., "App 2") to a second network service configuration (e.g. "config 2"). It is to be understood that the URSP 116 is provided for illustrative purposes only and is not meant to limit the broad scope of the present disclosure. In various embodiments, any number of applications can be mapped to a particular network service configuration.

For the embodiment of FIG. 1, in addition to various operations discussed for techniques herein, an AMF, such as the AMF instance 106, may facilitate access and mobility management control/services for one or more UE, such as UE 104, to facilitate registration, authentication, etc. for one or more UE to connect to the mobile core network. In addition to various operations discussed for techniques herein, an SMF, such as the SMF instance 108, may be responsible for UE Protocol Data Unit (PDU) session management (SM), with individual functions/services being supported on a per-session basis in order to facilitate data transfer(s) between a UE and one or more data network(s). Generally, a UPF, such as the edge UPF instance 114A or the edge UPF instance 114B, operate, in at least some embodiments, as a Virtual or Virtualized Network Function (VNF) to provide packet routing and forwarding operations for user data traffic and may also perform a variety of functions such as packet inspection, traffic optimization, Quality of Service (QoS) enforcement, policy enforcement and user data traffic handling (e.g., to/from data network(s)), as well as billing operations (e.g., accounting, etc.) for sessions of the UE 104. Typically, a PCF, such as the PCF instance 109, provides policy rules (e.g., network slicing, roaming, mobility management, etc.) for control plane functions and supports quality of service policy and charging control functions. In one instance, the PCF instance 109 may be an Access Management (AM) PCF.

A gNodeB, such as the gNodeB 126A and/or the gNodeB 126B, may implement a wireless wide area (WWA) (e.g., cellular) air interface and, in some instances also a wireless local area (WLA) (e.g., Wi-Fi®) air interface, for any combination of Radio Access Technology (RAT) types (sometimes referred to more generally as 'accesses') for a RAN, such as 3GPP WWA licensed spectrum accesses (e.g., 4G/LTE, 5G/New Radio (NR) accesses); 3GPP unlicensed spectrum accesses (e.g., Licensed-Assisted Access (LAA), enhanced LAA (eLAA), further enhanced LAA (feLAA), and New Radio Unlicensed (NR-U)); non-3GPP unlicensed spectrum WLA accesses, such as IEEE 802.11 (e.g., Wi-Fi®); IEEE 802.16 (e.g., WiMAX®), Near Field Communications (NFC), Bluetooth®, and/or the like; Citizens Broadband Radio Service (CBRS) accesses; combinations thereof; and/or the like.

Thus, gNodeB 126A and/or gNodeB 126B include, in at least some embodiments, hardware and/or software to perform baseband signal processing (such as modulation/demodulation) as well as hardware (e.g., baseband processors (modems), transmitters and receivers, transceivers, and/or the like), software, logic, and/or the like to facilitate signal transmissions and signal receptions via antenna assemblies (not shown) in order to provide over-the-air Radio Frequency (RF) coverage for one or more access types (e.g., 4G/LTE, 5G/NR, CBRS, etc.) through which one or more UE, such as UE 104, may utilize to connect to gNodeB 142 for one or more sessions (e.g., voice, video, data, gaming, combinations thereof, etc.).

A UE, such as UE 104, may be associated with any user, subscriber, employee, client, customer, electronic device, etc. wishing to initiate a flow in system 100 and may be inclusive of any device that initiates a communication in system 100, such as a computer, an electronic device such as an industrial device (e.g., a robot), automation device, enterprise device, appliance, Internet of Things (IoT) device (e.g., sensor, monitor, etc.), a laptop or electronic notebook, a router with a WWA/WLA interface, a WWA/WLA (cellular/Wi-Fi®) enabled telephone/smart phone, tablet, etc. and/or any other device, component, element, or object capable of initiating voice, audio, video, media, or data exchanges within system 100.

A UPF instance is responsible for packet routing and forwarding, packet inspection, QoS handling, and external PDU session for interconnecting a data network (DN). Generally, a UPF, such as the edge UPF instance 114A and/or edge UPF instance 114B, provides an interconnect point between mobile infrastructure and a data network. A UPF instance also provides a PDU session anchor point for providing mobility within and between RATs, including sending one or more end marker packets to a gNB.

A DNN is, in some embodiments, equivalent to an access point name (APN) in 4G/Long Term Evolution (LTE) networks. The DNN is a reference to a data network, and is used to select, in some embodiments, an SMF instance. In the disclosed embodiments, a combination of the DNN and the Operator-Service-Tag provide for selection of a UPF.

A core network generally includes network control and policy functions, such as the AMF instance 106, the SMF instance 108, the PCF instance 109, and a data plane, such as one or more UPFs, which provide data plane connectivity for UE sessions between a radio access network (e.g., to which a UE may connect via over-the-air RF connectivity) and one or more data networks (e.g., through which one or more application servers, etc. may be provided), through the use of default and/or dedicated bearers, which can be facilitated via the control functions.

Typically a PCF, such as the PCF instance 109, provides policy rules (e.g., network slicing, roaming, mobility management, etc.) for control plane functions and supports quality of service policy and charging control functions.

Network control functions include policy-based control plans and emerging traffic management and steering functions. Policy provides a framework for interactions with the bearer plane, determining how different flows are to be treated in the data plane. Policy determines the charging treatment. It also handles bearer control and quality of service assignment for specific flows. In addition, the policy layer exposes capabilities that enable third parties to access functionality in the core network.

FIG. 1 shows a first connection data flow 120A used when the UE 104 initiates a first connection request (e.g., a PDU session request) on behalf of the first application. The UE indicates, in some embodiments, via the first connection request, that the first network service configuration is to be used for the first application (e.g., create session request including {APP-1: S-NSSAI-1, DNN-1, RAT Type New Radio (NR), Operator-Service-Tag(&PROPERTY_CENTRAL_UPF)}). Since the UE indicates the first network service configuration associated with a central UPF should be used for the first application, the core network (e.g., SMF 108) selects a central UPF instance, such as the centrally located UPF instance 110, for use with the first connection data flow 120A. The connection then terminates at the first application server 122A for the first application.

A second connection data flow 120B is used when the UE 104 establishes a connection (e.g., a PDU session) on behalf of the second application. The UE indicates, in some embodiments, via a second connection request (e.g., PDU session establishment request), that the second network service configuration is to be used for the second connection request (e.g., create session request including {APP-2: S-NSSAI-1, DNN-1, RAT Type NR, Operator-Service-Tag (&PROPERTY_EDGE_UPF)}. As the UE indicates the second network service configuration should be used for the second application, the core network (e.g., SMF 108) selects an edge UPF instance, such as the edge UPF instance 114A for use with the second connection data flow 120B. The second connection data flow 120B then terminates at the second application server 122B of the second application. The selection of one of edge UPF instance 114A or edge UPF instance 114B by the core network (e.g., by SMF 108) can be based on the location of the UE 104 in addition to the network service configuration included in the connection request. For example, in an example embodiment, the UE 104 is connected to gNodeB 126A during network registration. As a result, the core network 102 (e.g., AMF instance 106) determines that UE 104 is proximate to MEC Site 112A rather than MEC site 112B and, thus, selects the edge UPF instance 114A as opposed to the edge UPF instance 114B.

Thus, FIG. 1 illustrates an ability for data passed by the UE 104 in a connection request to control or otherwise influence a network service configuration used to service the connection request. As discussed further below, some embodiments allow operators to establish mappings between UE applications and network service configurations that can be stored in a PCF instance 109 and provided to the UE 104 upon registration with the core network. Thus, one operator is able to utilize a first network service configuration for a particular application. A second operator, hosting the same application, may select a second, different network service configuration to service the same particular application. After the operator establishes the mapping, the mapping is passed by the core network to a UE associated with the operator. In some cases, the mapping is passed to the UE via inclusion of the mapping in a URSP, which is provided to the UE as part of the UE registration process.

Figure 2A:
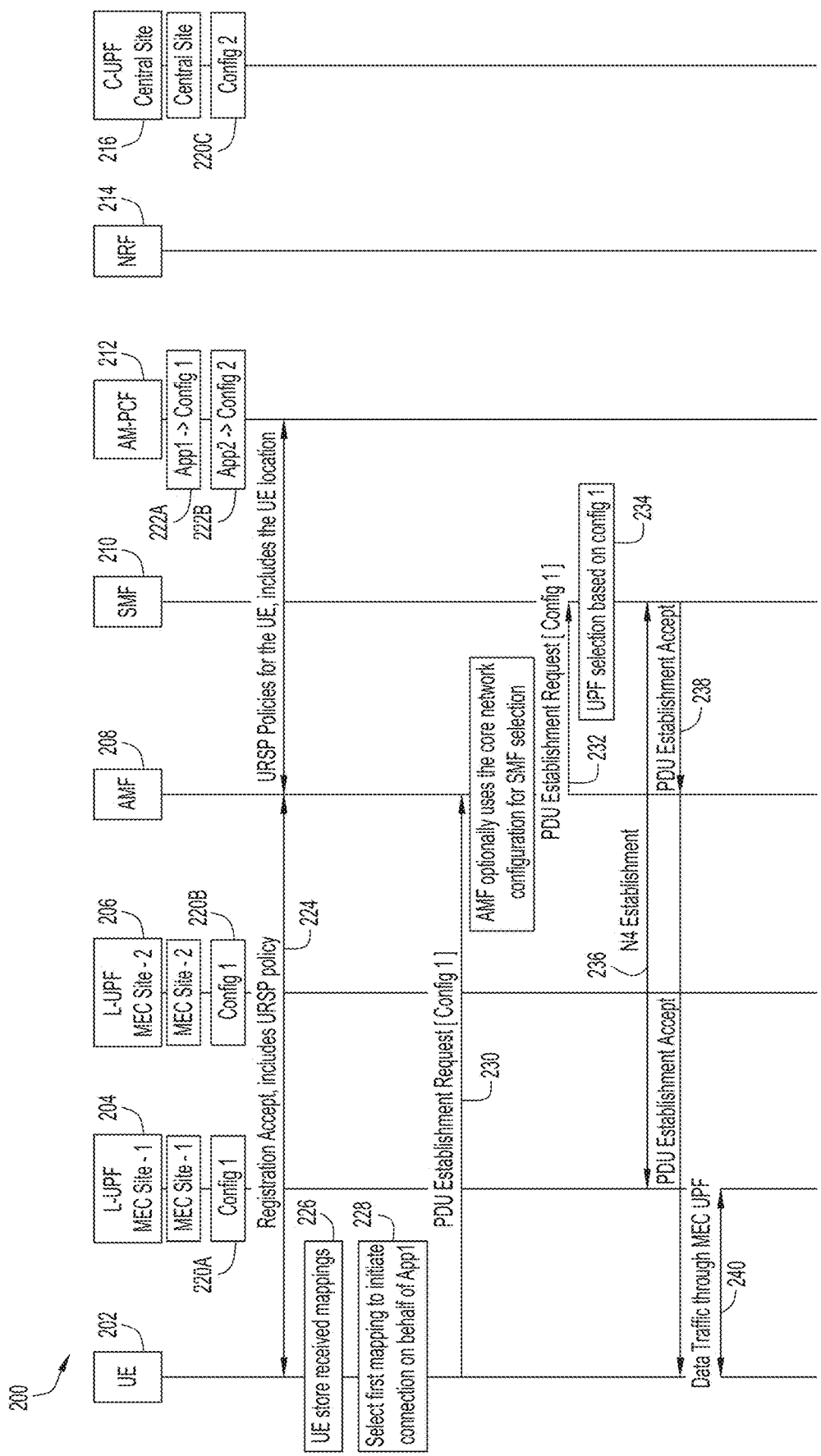
FIGS. 2A and 2B illustrate a call flow of two connection establishment procedures for two different applications, in accordance with an example embodiment.
Figure 2B:
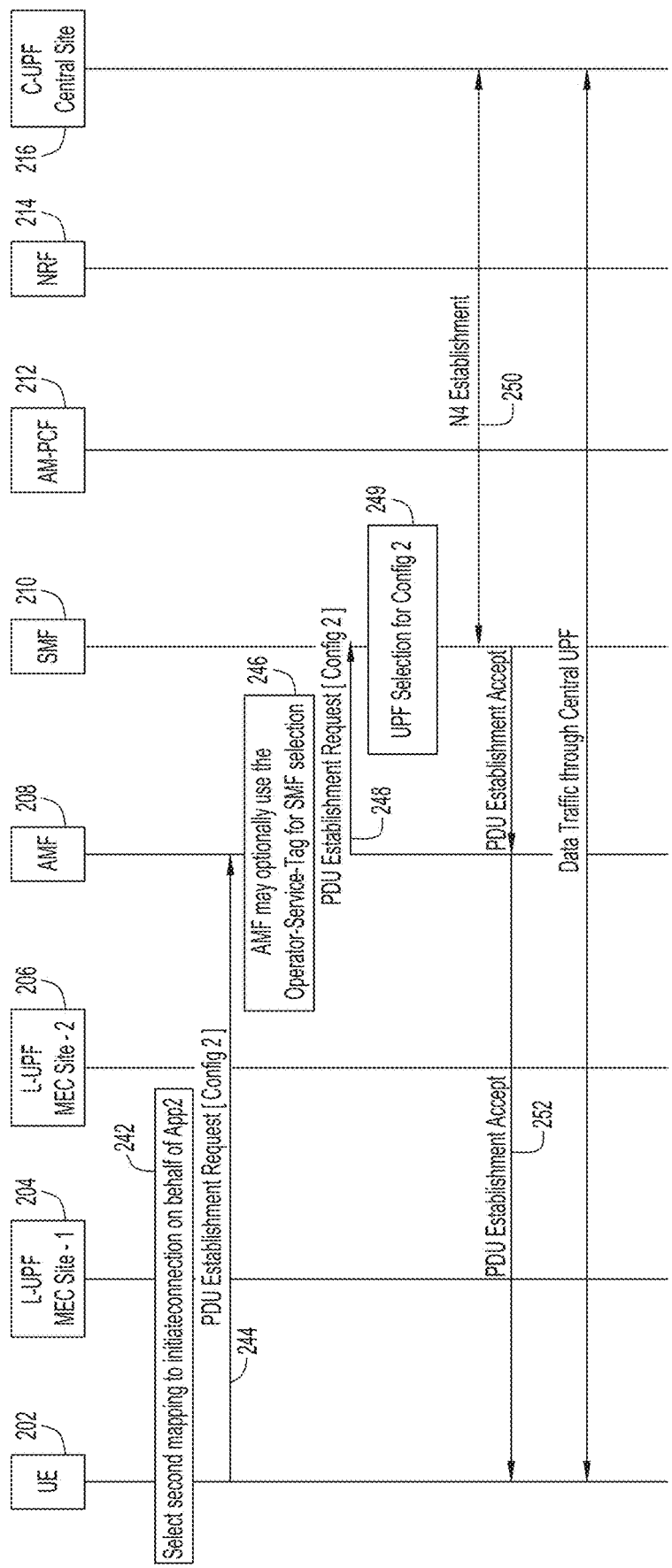

FIGS. 2A and 2B illustrate a call flow 200 of two connection establishment procedures for two different applications, in accordance with an example embodiment. FIG. 2A illustrates a UE 202, a first edge UPF instance 204 located at a first MEC site, a second edge UPF instance 206 located at a second MEC site, an AMF instance 208, an SMF instance 210, an access management policy control function (AM-PCF) instance 212, a network repository function (NRF) instance 214, and a centrally deployed UPF instance 216 (e.g., deployed within the core network 102 at central DC 111). Typically, an NRF, such as NRF 214, provides support for network function (NF) management (e.g., registering, deregistering, updating services to NFs/NF services), NF discovery (e.g., enabling NF service consumer(s) to discover a set of NF instances with a specific NF service/NF type and/or to discover a specific NF service), and NF access (e.g., NF authorization).

FIG. 2A illustrates that the first edge UPF instance 204 and the second edge UPF instance 206 are operative in a first network service configuration (e.g., specified via "Config 1"), as shown by configuration tag 220A and configuration tag 220B. The centrally deployed UPF instance 216 is operative in a second network service configuration (e.g., specified via "Config 2"), as shown by the configuration tag 220C. Note that the "Config 1" and "Config 2" labels of FIG. 2A are not intended to be equivalent to the "Config 1" and/or "Config 2" labels of FIG. 1.

Via the AM-PCF 212, an operator defines a first mapping 222A of a first application (e.g., a first application running on a UE) to the first network service configuration associated with the configuration tag 220A and a second mapping 222B of a second application (e.g., a second application running on the UE) to the second network service configuration associated with the configuration tag 220B.

While FIG. 2A shows a simplified version of the first mapping 222A and the second mapping 222B, in some embodiments, the first mapping 222A and/or second mapping 222B include additional data fields, for example, one or more of the data fields discussed above with respect to the example URSP policy structure. The first mapping 222A and/or the second mapping 222B are provided by the AM-PCF 212 to the UE 202 (via AMF 208 and the gNodeB to which the UE 202 is connected). In some embodiments, the AM-PCF 212 selects a mapping to provide to the UE 202 based on the UE 202 location. For example, in some embodiments, after the UE 202 attaches and registers with a core network (e.g., core network 102), a location of the UE 202 is determined. For example, in some embodiments, the UE 202's location is estimated, in some embodiments, based on to which gNB (not shown) the UE is connected.

As discussed above, in some embodiments, one or more of the first mapping 222A or the second mapping 222B are provided to the UE 202 as part of a URSP included in a registration accept communication 224, which includes the UE 202 location. The UE 202 stores the received mappings in operation 226.

The UE 202 then initiates a connection request on behalf of a first application in operation 228. As the mapping received from the AM-PCF 212 indicated the first application utilizes the first network service configuration, the UE 202 indicates the first network service configuration when initiating a PDU establishment request in a communication, as shown at 230. Upon receiving the PDU establishment request in the communication at 230, the AMF instance 208, in some embodiments, selects an SMF instance (e.g. the SMF instance 210) to service the connection request in the communication 230. In some embodiments, the SMF instance is selected based on the mapping. For example, in some embodiments, a particular SMF instance and UPF instance are associated, and generally assigned to service particular UE's or connections based on one or more attributes of an application executing on the UE 202. For example, a video application may be best serviced, in some embodiments, by a first SMF instance and a first UPF instance, while a gaming application may be best serviced, in some embodiments, by a second SMF instance and a second UPF instance. Once the SMF instance is selected, the AMF instance 208 forwards the PDU session request to the (selected) SMF instance 210 as shown at 232 (while FIGS. 2A-2B illustrates only a single SMF instance, some embodiments support multiple SMF instances, from which, in some embodiments, an AMF instance selects one SMF instance based on an indicated network service configuration).

The SMF instance 210 then determines in operation 234, a UPF instance to assign to service the connection based on the network service configuration information included in the communication 232. In some embodiments, the selection of the UPF instance is further based on a location of the UE initiating the PDU establishment request. For example, the SMF selects one of the first edge UPF instance 204 or the second edge UPF instance 206 based on the UE's location.

To complete the UPF instance assignment, the SMF instance 210 establishes an N4 connection via communication 236 with the first edge UPF instance 204. The SMF instance 210 then provides a PDU establishment accept communication 238 to the UE 202, acknowledging that the originally requested connection (via communication 230) has been established. Data traffic is then exchanged between the UE 202 and the first edge UPF instance 204 via communication 240.

As illustrated by FIG. 2B, the UE 202 then selects the second mapping to initiate a connection on behalf of the second application (executing on the UE 202) in operation 242. The UE 202 sends a second PDU establishment request in communication 244. The communication 244 indicates that the second network service configuration should be used to support the second PDU establishment request. Upon receiving the communication 244, the AMF instance 208 selects, in some embodiments of operation 246, an SMF instance based on the specified second network service configuration of the communication 244. After the SMF instance 210 is selected, the AMF instance 208 sends a communication 248 to the SMF instance 210. The communication 248 indicates use of the second network service configuration.

Upon receiving the communication 248, the SMF instance 210 selects a UPF instance in operation 249. Since the second network service configuration indicates a centrally deployed UPF instance 216 is to be used for the second PDU establishment request, the SMF instance 210 establishes an N4 level connection via communication 250 with the centrally deployed UPF instance 216. Once the N4 connection has been established via communication 250, the SMF instance 210 indicates to the UE 202 via communication 252 that the PDU establishment request has been granted via a PDU establishment accept message.

Figure 3:
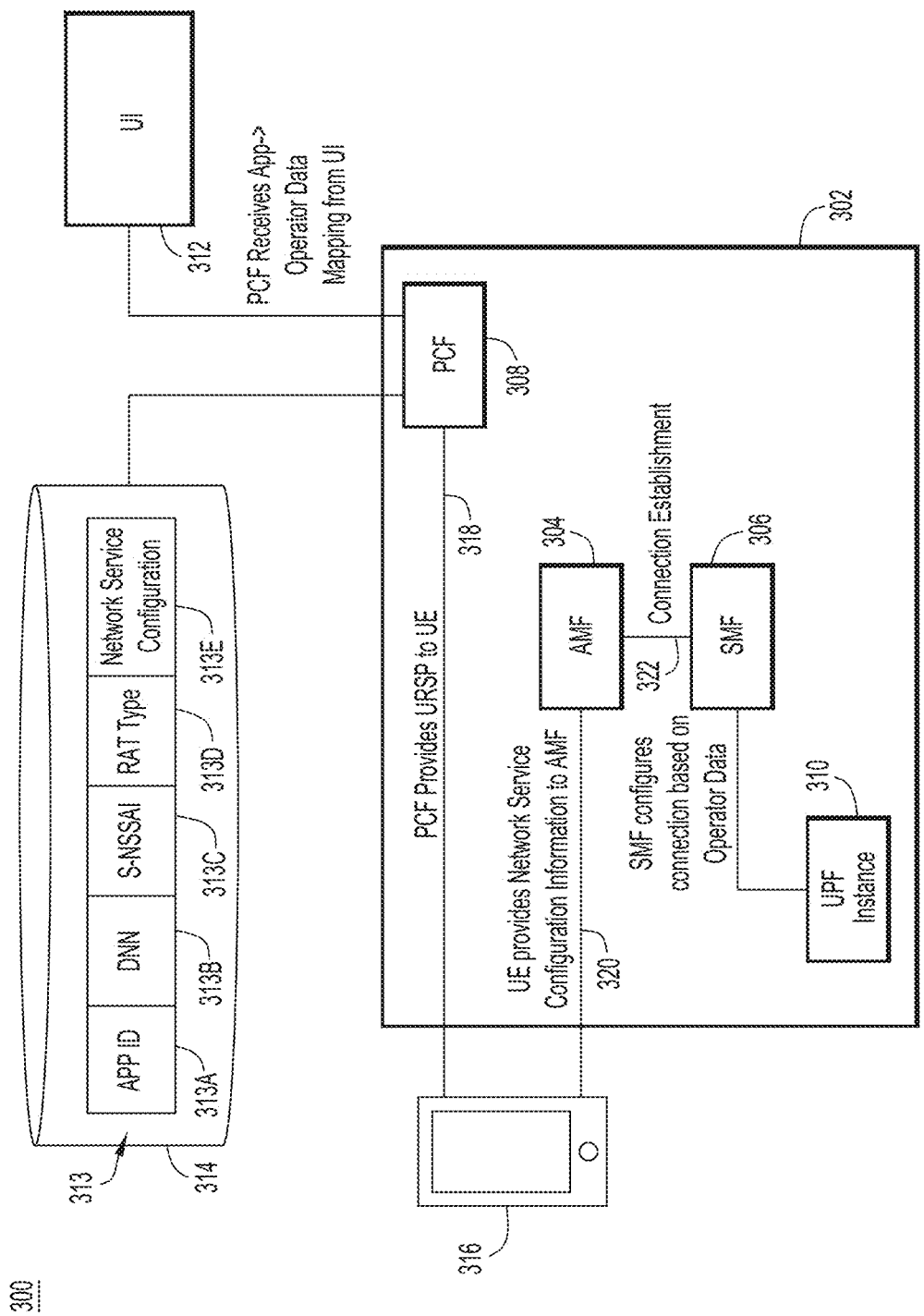
FIG. 3 is a block diagram of another system in accordance with an exemplary embodiment.

FIG. 3 is a block diagram of another system 300 in accordance with an exemplary embodiment. FIG. 3 illustrates a core network 302 includes an AMF instance 304, an SMF instance 306, a PCF instance 308, and a UPF instance 310. A configuration user interface (UI) 312 allows an operator to define one or more mappings 313 between applications and network service configurations. In some embodiments, the one or more mappings 313 are configured via the configuration UI 312 via configuration of a URSP. The one or more mappings 313 include one or more of an application identifier 313A, DNN 313B, S-NSSAI 313C, RAT type 313D, or a network service configuration 313E. The application identifier 313A uniquely identifies a unique application name or type of an application executed by a UE. The DNN 313B specifies a DNN to utilize when servicing the application identified by the application identifier 313A. The RAT type 313D specifies a RAT for use with the application identified by the application identifier 313A. The network service configuration 313E specifies how to configure the core network to service the application specified by the application identifier 313A.

The one or more mappings 313 (e.g., a URSP) are stored, via the PCF instance 308 in a configuration data store 314. The PCF instance 308 provides one or more of the mappings to a UE 316 via, for example, a registration message as shown at communication 318, which traverses the AMF instance 304 and a gNodeB to which the UE is connected. In some embodiments, one or more of the mappings 313 are provided to the UE 316 as part of a URSP; thus, the one or more mappings 313 are representative of or analogous to a URSP configured for UE 316. When the UE 316 initiates a communication 320 (e.g., a PDU session establishment request) on behalf of one of the applications identified in the one or more mappings 313 (e.g., the URSP for the UE), the UE 316 is configured to pass at least the network service configuration (e.g. a value, such as an Operator-Service-Tag, stored in network service configuration 313E) associated with the application via the one or more mappings 313 to the AMF instance 304. The Operator-Service-Tag can be used for enabling certain features/policies on a connection established by the UE 316. The Operator-Service-Tag can also be used for selection of an SMF instance and/or a UPF instance.

The AMF instance 304 forwards the connection request to the SMF instance 306 via a message 322. The SMF instance 306 then establishes the connection (PDU session) via the UPF instance 310 (e.g., edge UPF instance, central UPF instance, crypto capable UPF, etc.) based on the network service configuration indicated in the communication 320.

Figure 4:
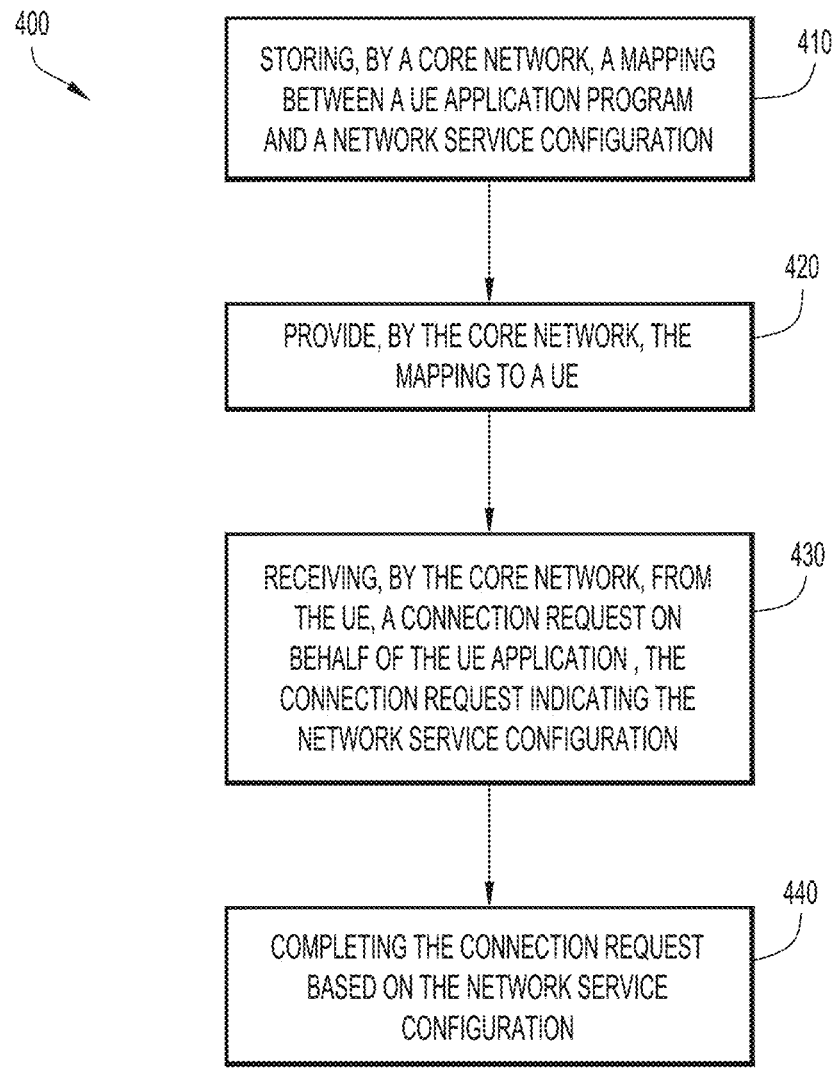
FIG. 4 is a flowchart of a method of establishing a connection based on operator-defined network service information, in accordance with an example embodiment.

FIG. 4 is a flowchart of a method 400 of establishing a connection based on a network service configuration, in accordance with an example embodiment. In some embodiments, the method 400 of FIG. 4 is performed by one or more components of a core network, such as an AMF instance, an SMF instance, a PCF instance, or a combination of these.

In operation 410, a core network (e.g., a PCF) stores a mapping between a UE application program and a network service configuration. As discussed above, different operators prefer to use different core architectures when supporting a common application. Thus, some of the disclosed embodiments provide for provisioning of an operator defined data value that is provided to UE's associated with the operator. This operator defined data value is then passed back to the core network by the UE under circumstances that are, in some embodiments, controlled by the UE. In some embodiments, the operator defined data value defines a network service configuration that supports a particular application provided by the operator. In some embodiments, the operator defined data value is a scalar value, and thus provides a single indication of a single variation in a network service architecture (e.g. anchoring a session via an edge UPF instance or a central UPF instance). In other embodiments, the operator defined data value includes multiple dimensions, and defines state values for a plurality of network service configuration parameters (e.g., an indication of a UPF instance being an edge or central UPF, and an indication that the UPF instance supports encrypted communications or communications in the clear).

Thus, for example, a first operator supports a first UE application via a central UPF instance located within the core network. A second operator supports the first UE application via a UPF instance located at a network edge. This is just one example. In some embodiments, the network service configuration indicates whether a UPF instance that supports encrypted communication is necessary to support a particular application, or whether a UPF instance that communicates using unencrypted communications is sufficient. Thus, the mapping of operation 410 indicates, for a particular operator, a network service configuration used by the operator when supporting a UE application also identified by the mapping.

UE applications are identified, in some embodiments, by a unique application identifier. Thus, if, for example, a first application runs on a first UE supported by a first operator, that application is identified via a first application identifier. The first application, when running on a second UE supported by a second operator, is also identified via the first application identifier. In some embodiments, different versions of the first application are identified by the same first application identifier, or, in other circumstances, one or more versions of the first application are identified via a first application identifier and one or more other versions of the first application are identified by a second application identifier. Applications in this context refer to, in an example embodiment, unique executable files resident on or installed on a UE (in this example, each different version of an application is identified via a different application identifier in a mapping). An application can refer to, in some embodiments, a unique entry in an "app store" of an operating system of the UE. In some embodiments, an application identifier uniquely identifies an application invoked when a particular "icon" is selected via a display of the UE. In some embodiments, metadata in application files of a UE indicate one or more data that uniquely identifies the application, and application identifiers included in the mappings identified above relate to this metadata identification. In some embodiments, an application identifier uniquely identifies a process or thread managed by an operating system of the UE. Generally, an application identified by the mappings discussed above is not technically part of an operating system of a UE, in that it does not run at an operating system privilege level, but instead makes use of application APIs provided by the operating system.

In operation 420, the mapping is provided to a UE. In some embodiments, the mapping is provided as part of a URSP to the UE during registration of the UE with the core network. In some embodiments, the mapping is provided to the UE as part of a registration accept message, for example as illustrated above with respect to FIGS. 2A-2B. In some embodiments, operation 420 includes providing a plurality of mappings to the UE. In some embodiments, each of the mappings identifies a different UE application, and provides an appropriate network service configuration for each respective UE application.

The disclosed embodiments contemplate that a UE is configured to determine an application identifier appropriate for one or more applications installed on or otherwise configured to run on the UE. Thus, when the UE executes an application, the UE determines an application identifier of the executing application, and is able to identify a network service configuration to apply to the executing application based on the mapping. In some embodiments, an identifier of an application is stored in metadata of an executable file storing the instructions that comprise the application itself. Thus, the UE extracts the application identifier from the applicant's metadata in these embodiments, and consults the mapping to determine an appropriate network service configuration for the application. In other embodiments, the UE determines a "name" and/or a version of the application, and identifies a mapping that applies to the application based on the name and/or version.

In operation 430, the core network obtains, from the UE, a request on behalf of a UE application, and the request indicates a network service configuration for servicing the request. In some embodiments, the request is a connection request, such as a PDU session establishment request message as discussed above with respect to FIGS. 2A-2B. In these embodiments, the mapping is indicated, in some of these embodiments, using extended Protocol Configuration Options (ePCO). Alternatively, in some other embodiments, the mapping is indicated in an information element (IE) included with the PDU session establishment request. In some embodiments, the request indicates a DNN of the connection request.

In operation 440, the request is completed based on the network service configuration. Thus, operation 440 includes establishing the PDU session for the UE consistent with the indicated network service configuration such that any servicing of the request by the core network utilizes the indicated configuration. Thus, for example, if the indicated network service configuration indicates the PDU session is to be serviced via an edge UPF instance (e.g., such as the first edge UPF instance 204 or the second edge UPF instance 206 of FIGS. 2A-2B), the core network, such as an SMF selects an edge UPF instance establishes the PDU session for the UE via the edge UPF instance, as opposed to establishing the PDU session for the UE at the centrally deployed UPF instance 216 of FIGS. 2A-2B). Some embodiments of a core network maintain a connection table that indicates particular attributes of the core network for use in servicing the request. Thus, for example, if the network service configuration specifies a particular UPF deployment configuration for servicing the request, operation 440 selects a UPF instance consistent with the UPF deployment configuration, and stores an indication that the selected UPF instance is for use by the connection.

In some embodiments, an SMF instance is selected based on the indicated network service configuration. In some embodiments, operation 440 includes processing data from the UE application over the connection (PDU session) established as part of completing the request. Thus, for example, if a connection data path was established, based on the indicated network service configuration, so as to utilize an edge UPF for the connection, data transmitted by the UE over the connection would also flow through the edge UPF. If a second connection data path (PDU session) was established, based on a second indicated network service configuration, so as to utilize a central UPF for the second connection, data transmitted over the connection would flow through the central UPF.

Figure 5:
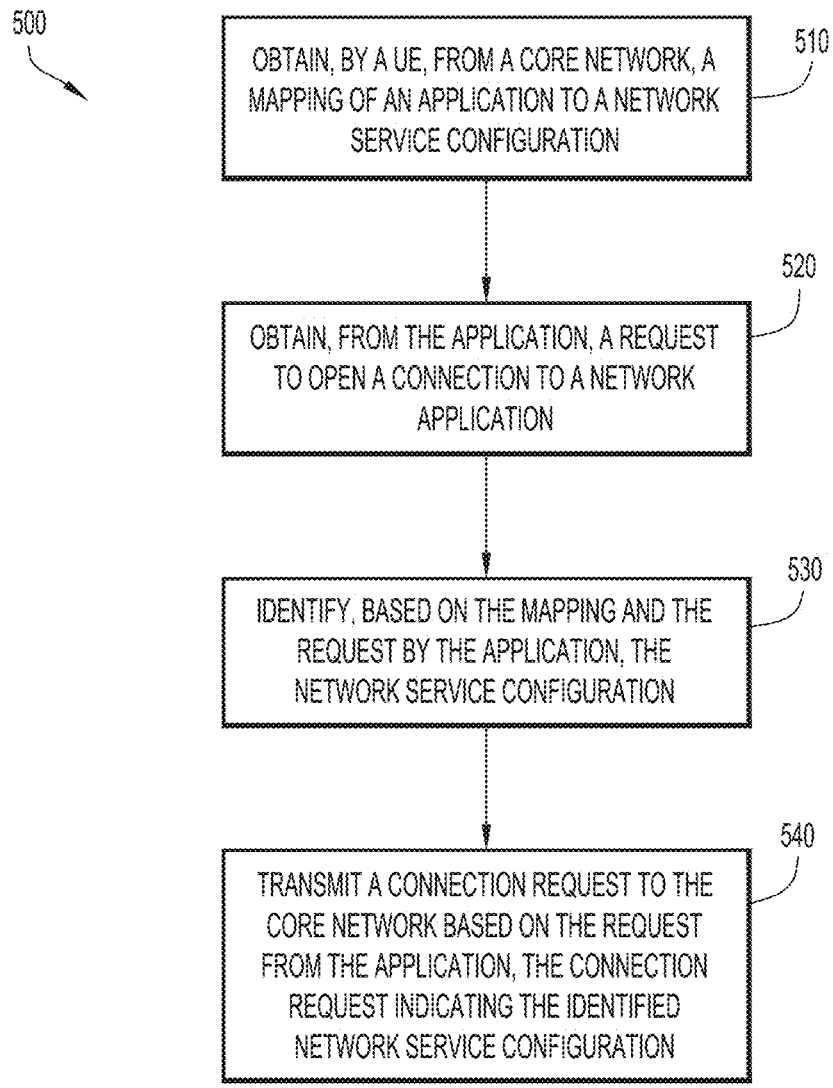
FIG. 5 is a flowchart of a method of establishing a connection based on a network service configuration.

FIG. 5 is a flowchart of a method of establishing a connection based on a network service configuration. In some embodiments, one or more operations of the method 500 discussed below is performed by a UE, such as any of the UE's discussed above with respect to FIGS. 1-4.

In operation 510, a mapping of an application identifier to a network service configuration is obtained by a UE. In some embodiments, the mapping is obtained via a registration accept message received from a core network. In some embodiments, the mapping is analogous to the one or more mappings 313 discussed above with respect to FIG. 3, which may be representative of a URSP configured for the UE. In some embodiments, the mapping includes one or more of the fields of the one or more mappings 313. In some embodiments, operation 510 includes obtaining a URSP from the core network, and the mapping is included within the URSP. In some embodiments, the URSP includes a plurality of mappings, each mapping a different application to a particular network service configuration. In some embodiments, operation 510 includes storing the mapping in a non-transient memory, such as in a static RAM, SSD drive, or traditional hard disk drive.

In operation 520, a request to open a network connection is obtained from an application. In some embodiments, the request is obtained by a UE, for example, via a method invocation of an operating system application programming interface (API). (e.g., via a portable operating system interface (POSIX) connect( ) API call). In operation 530, a network service configuration is identified. The network service configuration is identified based on the mapping and the request by the application of operation 520. Thus, some embodiments of operation 530 search one or more mappings maintained by a device performing the method 500 (e.g. a UE), to identify one or more mappings identifying the application. Once such a mapping is found, a portion of the mapping referencing a network service configuration appropriate for that application is identified from the mapping.

In operation 540, a connection request is transmitted to the core network. The connection request, in some embodiments, is a PDU session establishment request. The connection request indicates the network service configuration identified in operation 530 (e.g. via inclusion of an identifier of the network service configuration in the connection request message itself). In some embodiments, the connection request is transmitted to an AMF component of the core network via a gNodeB to which the UE is connected, as generally illustrated in FIG. 3 with respect to communication 320.

Some embodiments of method 500 include obtaining a PDU establishment accept message from the core network, indicating the connection has been established. The application then, in at least some embodiments, exchanges data with a remote peer or network application via the established connection.

Figure 6:
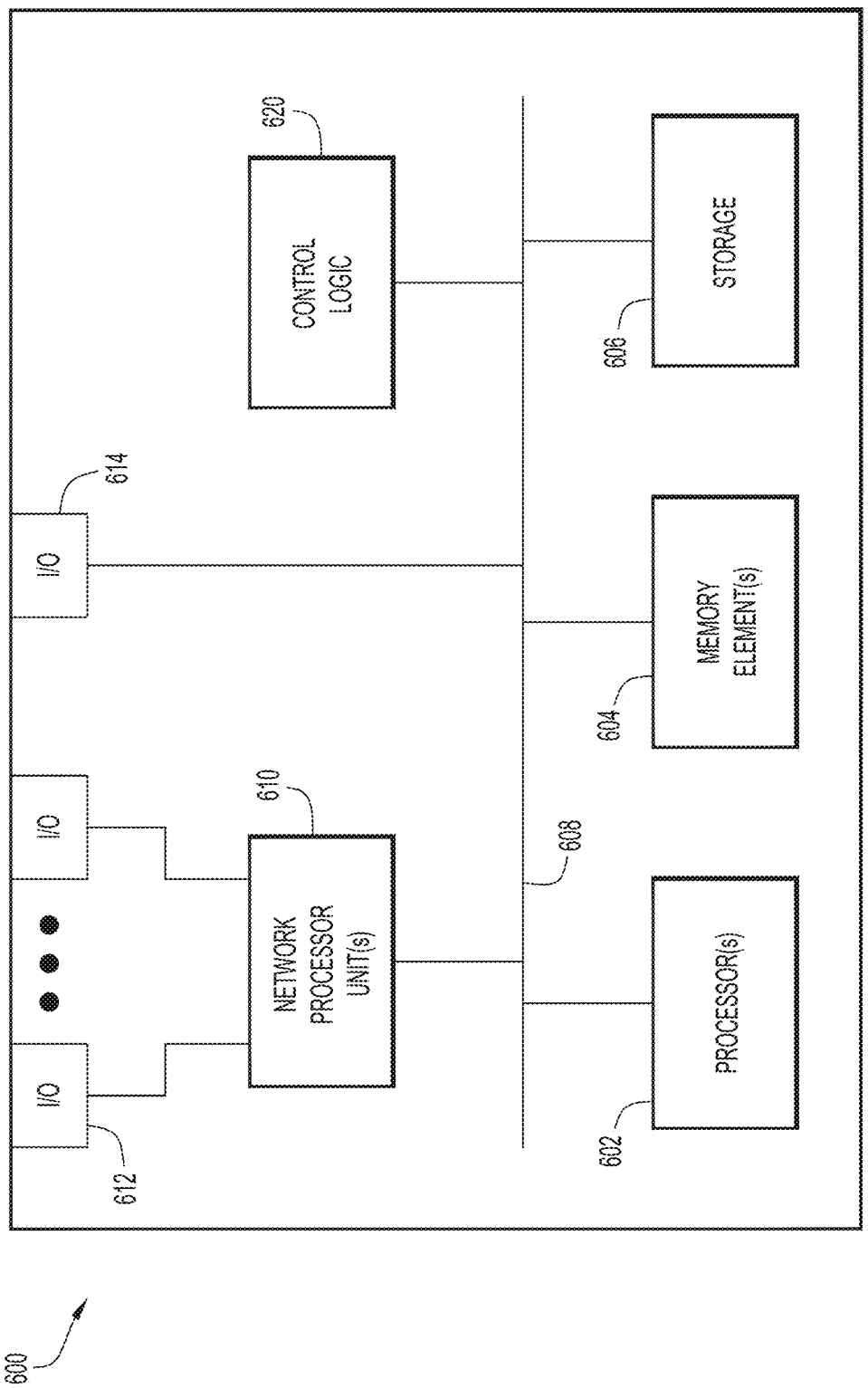
FIG. 6 is a hardware block diagram of a device that may perform functions associated with operations discussed herein in connection with the techniques depicted in any one or more of FIGS. 1-5.

FIG. 6 is a hardware block diagram of a device 600 that may perform functions associated with operations discussed herein in connection with the techniques depicted in any one or more of FIGS. 1-5. In various embodiments, any of the devices or components described above (e.g., a UE, a core network, or core network component such as an AMF or SMF) implement, in some embodiments, a computing architecture analogous to that described below with respect to the device 600.

In at least one embodiment, the device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for device 600 can overlap in any manner and are not limited to the specific allocation of instructions and/or operations described herein.

In at least one embodiment, processor(s) 602 is/are at least one hardware processor configured to execute various tasks, operations and/or functions for device 600 as described herein according to software and/or instructions configured for device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, physical layer (PHY), controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with device 600, and/or logic configured for memory element(s) 604 and/or storage 606. For example, any logic described herein (e.g., control logic 620) can, in various embodiments, be stored for device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of device 600 to communicate in order to exchange information and/or data. Bus 608 can be implemented with any architecture designed for passing control, data and/or information between processors, memory elements/storage, peripheral devices, and/or any other hardware and/or software components that may be configured for device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between device 600 and other systems, devices, or entities, via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between device 600 and other systems, devices, or entities to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to device 600. For example, I/O interface(s) 614 may provide a connection to external devices such as a keyboard, keypad, a touch screen, and/or any other suitable input and/or output device now known or hereafter developed. This may be the case, in particular, when the device 600 serves as a user device described herein. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, such as display, particularly when the device 600 serves as a user device as described herein.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

Referring to FIG. 7, FIG. 7 is a hardware block diagram of a radio device 700 that may perform functions associated with operations discussed herein. In various embodiments, a radio device or apparatus, such as radio device 700 or any combination of one or more of the radio device 700, may be configured as any radio node/nodes as depicted herein in order to perform operations of the various techniques discussed herein, such as operations that may be performed by any of an RU, an O-RU, and/or a UE.

In at least one embodiment, radio device 700 may be any apparatus that may include one or more processor(s) 702, one or more memory element(s) 704, storage 706, a bus 708, a baseband processor or modem 710, one or more radio RF transceiver(s) 712, one or more antennas or antenna arrays 714, one or more I/O interface(s) 716, and control logic 720.

The one or more processor(s) 702, one or more memory element(s) 704, storage 706, bus 708, and I/O interface(s) 716 may be configured/implemented in any manner described herein, such as described herein at least with reference to FIG. 6.

The RF transceiver(s) 712 may perform RF transmission and RF reception of wireless signals via antenna(s)/antenna array(s) 714, and the baseband processor (modem) 710 performs baseband modulation and demodulation, etc. associated with such signals to enable wireless communications for radio device 700.

In various embodiments, control logic 720, can include instructions that, when executed, cause processor(s) 702 to perform operations, which can include, but not be limited to, providing overall control operations of radio device 700; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, compact disc (CD) read only memory (ROM) (CD-ROM), digital video disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In summary, techniques herein provide, in some embodiments, various features for delivering a policy to a UE (e.g., a URSP) by a 3GPP 5G and/or nG core network for binding applications to a specific service tag (e.g., an Operator-Service-Tag). The operator service tag indicates one or more properties of a PDU session for a particular application. For example, in some embodiments, the service tag is used by the UE to indicate a network service configuration when establishing a PDU session for the particular application executing on the UE. Thus, some embodiments establish a plurality of predefined scalar or constant values, and associate with each of those values a particular network service configuration. For example, the plurality of predefined scalar values indicate, in some embodiments, whether a UPF instance anchoring a PDU session is located at a network edge or within a core network. In some embodiments, the operator service tag also indicates whether a UPF instance capable of communicating via an encrypted session is to anchor the session, or whether a UPF instance communicating in the clear will anchor the session. Some embodiments define operator service tags having multiple dimensions, and thus are capable of indicating a plurality of different state information. For example, a first dimension indicates a type of UPF instance deployment (e.g. central or edge), and a second dimension indicates whether the UPF instance communicates in the clear or via an encrypted channel.

In some embodiments, the operator-service-tag is included, in addition to an S-NSSAI, DNN, and a RAT Type, in a URSP. For example, a URSP may take the form of {App-1: S-NSSAI-1, DNN-1, RAT-1, Operator-Service-Tag-1} in some embodiments. Some embodiments achieve the binding via the UE using the URSP for requesting the network to create a PDU session in a given DNN. The UE also includes, in the request, the operator-service-tag obtained from an entry of the URSP identifying the application upon which the connection is being established. This operator-service tag provides a "hint" to the core network as to how the PDU should be configured to best support the application. Some embodiments also utilize the operator-service-tag indicated in the PDU session request to select a UPF instance with which to anchor the session (e.g., in additional to S-NSSAI, DNN, and RAT parameters). Some embodiments also select an SMF instance based on the network service configuration.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., fourth generation (4G)/fifth generation (5G)/next generation (nG), an IEEE 802.11 (e.g., Wi-Fi®/Wi-Fi6®), IEEE 802.15 (e.g. Wireless Personal Area Networks (WPAN)), IEEE 802.16 (e.g., Worldwide Interoperability for Microwave Access (WiMAX)), Radio-Frequency Identification (RFID), Near Field Communication (NFC), Bluetooth™, millimeter (mm). wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In one form, a method is provided that includes storing, by a core network, a mapping between a user equipment (UE) application and a core network service configuration, wherein the network service configuration is associated with a user plane function (UPF) type, providing, by the core network, the mapping to a UE, obtaining, from the UE, a connection request on behalf of the UE application, the connection request including the core network service configuration; and completing the connection request based on the core network service configuration obtained from the UE.

In another form, an apparatus is provided that comprises a network interface configured to enable network communications, one or more processors, and one or more memories storing instructions that when executed configure the one or more processors to perform operations comprising a storing, by a core network, a mapping between a user equipment (UE) application and a core network service configuration, wherein the network service configuration is associated with a user plane function (UPF) type, providing, by the core network, the mapping to a UE, obtaining, from the UE, a connection request on behalf of the UE application, the connection request including the core network service configuration; and completing the connection request based on the core network service configuration obtained from the UE.

The methods presented herein may be embodied in a non-transitory computer readable storage medium comprising instructions that when executed configure one or more processors to perform the operations of the method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method, comprising:
obtaining, by a wireless device from a mobile core network, a policy that identifies at least one user plane function (UPF) property that is to be used in selecting a UPF for a connection with the mobile core network involving an application of the wireless device; and
transmitting, by the wireless device and based on the policy, a connection request to the mobile core network on behalf of the application that includes an identifier of the application and the at least one UPF property, wherein the connection with the mobile core network is to be established using a particular UPF that is to be selected based on the at least one UPF property included in the connection request.

2. The method of claim 1, wherein the policy is a user equipment (UE) route selection policy (URSP).

3. The method of claim 1, wherein the connection request is a Protocol Data Unit (PDU) session establishment request.

4. The method of claim 1, wherein the at least one UPF property indicates that one of a central data center UPF or a network edge UPF is to be selected for the connection with the mobile core network involving the application of the wireless device.

5. The method of claim 1, wherein the at least one UPF property indicates that an encryption capable UPF that is configured to process encrypted traffic is to be selected for the connection with the mobile core network involving the application of the wireless device.

6. The method of claim 1, wherein the policy identifies, for one or more other applications of the wireless device, at least one UPF property that is to be used in selecting a corresponding UPF for a corresponding connection with the mobile core network involving each of the one or more other applications of the wireless device.

7. The method of claim 1, wherein the policy is obtained from the mobile core network through a registration between the wireless device and the mobile core network.

8. A wireless device, comprising:
at least one memory element for storing data; and
at least one processor for executing instructions associated with the data, wherein executing the instructions causes the wireless device to perform operations, comprising:
obtaining, from a mobile core network, a policy that identifies at least one user plane function (UPF) property that is to be used in selecting a UPF for a connection with the mobile core network involving an application of the wireless device; and
transmitting, based on the policy, a connection request to the mobile core network on behalf of the application that includes an identifier of the application and the at least one UPF property, wherein the connection with the mobile core network is to be established using a particular UPF that is to be selected based on the at least one UPF property included in the connection request.

9. The wireless device of claim 8, wherein the policy is a user equipment (UE) route selection policy (URSP).

10. The wireless device of claim 8, wherein the connection request is a Protocol Data Unit (PDU) session establishment request.

11. The wireless device of claim 8, wherein the at least one UPF property indicates that one of a central data center UPF or a network edge UPF is to be selected for the connection with the mobile core network involving the application of the wireless device.

12. The wireless device of claim 8, wherein the at least one UPF property indicates that an encryption capable UPF that is configured to process encrypted traffic is to be selected for the connection with the mobile core network involving the application of the wireless device.

13. The wireless device of claim 8, wherein the policy identifies, for one or more other applications of the wireless device, at least one UPF property that is to be used in selecting a corresponding UPF for a corresponding connection with the mobile core network involving each of the one or more other applications of the wireless device.

14. The wireless device of claim 8, wherein the policy is obtained from the mobile core network through a registration between the wireless device and the mobile core network.

15. One or more non-transitory computer readable storage media encoded with instructions that, when executed by a processor, cause the processor to perform operations, comprising:
obtaining, by a wireless device from a mobile core network, a policy that identifies at least one user plane function (UPF) property that is to be used in selecting a UPF for a connection with the mobile core network involving an application of the wireless device; and
transmitting, by the wireless device and based on the policy, a connection request to the mobile core network on behalf of the application that includes an identifier of the application and the at least one UPF property, wherein the connection with the mobile core network is to be established using a particular UPF that is to be selected based on the at least one UPF property included in the connection request.

16. The media of claim 15, wherein the policy is a user equipment (UE) route selection policy (URSP).

17. The media of claim 15, wherein the at least one UPF property indicates that one of a central data center UPF or a network edge UPF is to be selected for the connection with the mobile core network involving the application of the wireless device.

18. The media of claim 15, wherein the at least one UPF property indicates that an encryption capable UPF that is configured to process encrypted traffic is to be selected for the connection with the mobile core network involving the application of the wireless device.

19. The media of claim 15, wherein the policy identifies, for one or more other applications of the wireless device, at least one UPF property that is to be used in selecting a corresponding UPF for a corresponding connection with the mobile core network involving each of the one or more other applications of the wireless device.

20. The media of claim 15, wherein the policy is obtained from the mobile core network through a registration between the wireless device and the mobile core network.

* * * * *